United States Patent Office 3,562,147
Patented Feb. 9, 1971

3,562,147
CATALYTIC REFORMING OF HYDROCARBONS
Ernest L. Pollitzer, Skokie, and John C. Hayes, Palatine, Ill., assignors to Universal Oil Products Company, Des Plaines, Ill., a corporation of Delaware
No Drawing. Filed Apr. 24, 1968, Ser. No. 723,897
Int. Cl. C10g 35/08
U.S. Cl. 208—139                                                  7 Claims

ABSTRACT OF THE DISCLOSURE

Concerns an improvement in a continuous process for the catalytic reforming of a gasoline fraction to produce a high octane reformate stream. Catalyst utilized comprises a platinum group metallic component, a rhenium component, a halogen component, and a sulfur component, all of which are composited with an alumina carrier material. Improved process involves continuously contacting the gasoline fraction, hydrogen, and about 50 to 3000 wt. p.p.m. of equivalent sulfur, based on the hydrocarbon fraction, with the catalyst at reforming conditions—particularly, a pressure of about 100 to 350 p.s.i.g. Points of improvement involves: overall stability, catalyst life before regeneration, and rate of deposition of carbonaceous deposits on the catalyst.

DISCLOSURE

The subject of the present invention is an improvement in a catalytic reforming process wherein a low octane hydrocarbon fraction boiling in the gasoline range is converted, at high yields, into an aromatic-rich reformate. More precisely, the present invention relates to an improved process for transforming with minimum yield loss, a hydrocarbon charge stock having low aromatics content, and corresponding low octane number, into a product stock having a substantially higher concentration of aromatics with attendant high octane number.

The conception of the present invention was a product of a number of recent developments associated with continuous catalytic reforming processes. First, it was determined that the use of a catalytic composite containing a platinum metal component and a rhenium component supported on an alumina carrier material enables significant improvements in the performance of the process. Coupled with this development was the recognition of the detrimental effects of small concentrations of water on the performance of such a process. Now we have additionally found the continuous addition of controlled quantities of sulfur or sulfur-containing compound to such a reforming process is extremely beneficial. More specifically, we have found that the use of a catalyst containing a platinum metal and rhenium on a suitable support in conjunction with a continuous addition of sulfur to the reforming process and continuous exclusion of water therefrom, effects a significant and surprising improvement in the stability of the resulting process—particularly at low pressure.

It is well known in the art that the requirements for an optimum process for transforming low octane charge stocks into high octane product stocks, at minimum loss to undesired products, involves a dual-function catalyst, a reaction environment, and process conditions, designed to promote octane-upgrading reactions for paraffins and naphthenes. Paraffins are undoubtedly the component of gasolines that have the highest octane-improving potential, since many of the straight-chain paraffins are in the 0–50 range of the octane scale. For paraffins, the upgrading reactions are: isomerization of the relatively straight-chain paraffins to more highly branched paraffins, dehydrogenation to olefins, dehydrocyclization to aromatics, and selective hydrocracking to lower molecular weight, more highly branched paraffins. Of these, the dehydrocyclization reaction is the one yielding the maximum gain in octane number, and is consequently preferred. Since this dehydrocyclization reaction releases four moles of hydrogen, it is obviously favored by low hydrogen partial pressure and by low total system pressure.

Naphthenes, on the other hand, are not as potentially productive of octane increase as are paraffins, since the clear research octane number of most naphthenes is in the range of 65–80. Nevertheless, they are a substantial source of octane improvement via the upgrading reactions of dehydrogenation to aromatics, ring isomerization, etc. Since one mole of naphthenes will typically produce one mole of aromatics and three moles of hydrogen, these reactions are similarly favored by low hydrogen partial pressure and by low total system pressure.

Besides these upgrading reactions, it is clear that a substantial number of other reactions are simultaneously proceeding, to some extent, in a typical reforming operation. These, as is true with any complex set of reaction mechanisms, are injected into the over-all picture by the uncontrollable side phenomena that are produced by a myriad of factors that color and complicate the actual operation of a real process. Examples of these side reactions are: demethylation and dealkylation of alkylaromatics and alkylnaphthenes; ring-opening of naphthenes, excessive hydrocracking of aliphatics to light gases; thermal cracking of non-aromatic hydrocarbons; dehydrogenation and condensation of aromatics to form polynuclear aromatics which are carbonaceous deposit precursors; acid-catalyzed polymerization and alkylation with olefins and other highly reactive components to yield high molecular weight products which, after further dehydrogenation, can contribute to the carbonization of the catalyst, etc. For purposes of discussion, here, these side reactions are conveniently divided into those that are associative such as condensation, polymerization, etc., and those that are dissociative such as cracking and hydrocracking. The associative reactions are generally the chief culprits in the observed principal mechanisms of catalyst deactivation in reforming: the formation of carbonaceous deposits on the catalyst. It is clear that these association reactions are generally net producers of hydrogen and are consequently, promoted by low hydrogen partial pressure and low system pressure. On the other hand, it is evident that the dissociation reactions generally consume hydrogen and are promoted by high hydrogen partial pressure.

Considering that the previously mentioned principal upgrading reactions are net producers of hydrogen, they, likewise, are inhibited by high hydrogen partial pressure and by high total system pressure. Viewed from the prospective of hydrogen and pressure interaction, a greatly simplified picture of a typical reforming operation becomes: low partial pressure of hydrogen coupled with low system pressure promote the desired upgrading reactions while simultaneously promoting the association reactions which via a carbonization mechanism deactivate the catalyst and destroy process stability; while high hydrogen partial pressure in conjunction with high system pressure adversely effects the desired upgrading reactions, promote stability by inhibiting the association reactions and result in yield losses via promotion of dissociation reactions. Consequently, the solution to the problem of operating a reforming process to produce a high quality reformate in a stable fashion typically becomes, for a given catalyst and charge stock, a balance between the minimum hydrogen partial pressure and system pressure resuired to maintain a clean catalyst surface and the relative effects of this minimum partial pressure and system pressure on the hydrogen-consuming and hydrogen-producing reactions.

Extensive studies have shown that in order to accelerate the upgrading reactions, while simultaneously holding the side-reactions reasonably in check, a dual-function catalyst containing a hydrogenation-dehydrogenation function and an acid-acting function is necessary. In particular, a catalyst containing a platinum metal component in association with an acid-acting support has achieved a dominant position in this art. Recently, there has been developed a markedly superior dual-function catalyst which, in addition to a platinum metal component, contains a rhenium component. Now we have determined that when this superior catalyst is used in a reforming environment in conjunction with a controlled concentration of hydrogen sulfide and the substantial exclusion of water from this environment, that the stability of the resulting process is greatly improved relative to that theretofore experienced with conventional reforming catalysts and, more importantly, this stability feature is particularly evident at low hydrogen partial pressure and low total pressure.

This stability feature of the present invention is of particular significance in a continuous reforming process: that is, a reforming process that operates, without regeneration, for a catalyst life of at least 15 barrels of charge per pound of catalyst contained therein (BPP). In this system, one advantage of the present invention is that it allows operation at pressure levels that have not heretofore been feasible because of the adverse effects of low pressure on catalyst stability as explained above. Another advantages is that at pressure levels that have heretofore been normally used for this system, the present invention greatly extends the catalyst life cycle before regeneration.

It is, accordingly, an object of the present invention to provide improvements in a continuous reforming system. A second object is to increase the stability of a continuous reforming process. A third object is to enable a continuous reforming process to operate at low pressure. A related object is to extend the catalyst life of a continuous reforming process operated at conventional pressures. Another object is to provide a method for suppressing carbon formation on a catalyst used in a continuous reforming process.

In one embodiment, this invention encompasses a continuous process for reforming a gasoline fraction to produce a high octane reformate. This process comprises continuously contacting, in a substantially water-free reforming zone, at reforming conditions the gasoline fraction, hydrogen, and sulfur or a sulfur-containing compound with a reforming catalyst comprising a platinum group metallic component, a rhenium component, a sulfur component and a halogen component, composited with an alumina carrier material. The process is further characterized in that the sulfur or sulfur-containing compound is continuously introduced into the reforming zone in an amount, calculated as elemental sulfur, equivalent to about 50 to about 3000 wt. p.p.m. of the gasoline fraction.

A second embodiment relates to the process described above where the reforming catalyst contains, on an elemental basis, about 0.1 to about 1.5 wt. percent of the halogen, about 0.05 wt. percent to about 1.0 wt. percent of the platinum group metal, about 0.05 wt. percent to about 1.0 wt. percent rhenium, and about 0.05 to about 0.05 wt. percent sulfur.

A third embodiment relates to the process described in the first embodiment wherein the reforming conditions include a pressure of 100 to 350 p.s.i.g.

Another embodiment relates to the process described in the first embodiment where the sulfur-containing compound is a mercaptan that is admixed with the gasoline fraction.

Other objects and embodiments of the present invention relate to details about: the charge stocks that are processed therein, the sulfur compounds that can be used to achieve the desired amounts of sulfur, the reforming catalyst structure and composition employed, the mechanisms of injecting and maintaining the sulfur levels therein, and the like particulars. These will appear hereinafter in the detail explanation of each of these facets of the present invention.

Before considering in detail the various ramifications of the present invention, it is convenient to define several of the terms, phrases, and expressions used in the specification and in the appended claims. The phrase "gasoline fraction" is intended to refer to a portion of a petroleum crude oil, of a mixture of synthesized hydrocarbons, of a coal tar distillate, of a shale oil, etc., that boils anywhere within the gasoline temperature range of about 50° F. to about 400° F. and typically has a gravity on the API scale at 60° F. of 50 to 70. The expression "sulfur entering the reforming zone" is to be construed to mean the total quantity of equivalent sulfur entering the reforming zone as elemental sulfur or in sulfur-containing compounds. The amounts of sulfur given herein are calculated as weight parts of equivalent sulfur per million weight parts of the gasoline fraction. The expression "substantially free from water" refers to the situation where the total water and water-producing substances entering the reforming zone from any source is less than 25 wt. p.p.m. based on the gasoline fraction calculated as equivalent weight of water. The term "activity" when it is applied to reforming operations refer to the ability of the process to produce, at a specified severity level a $C_5+$ reformate product of the required quality as measured by octane number. The term "stability" when it is applied to the reforming process refers to the rate of change of the operating parameters associated with the process; for instance, a common measure of stability is the rate of change of reactor temperature that is required to maintain a given octane number in output product—the smaller slope implying the more stable process. The "liquid hourly space velocity" is defined to be the equivalent liquid volume of the charge stock flowing over the bed of catalyst per hour divided by the volume of the reforming zone containing catalyst.

The charge stock that can be reformed in accordance with the process of the present invention comprise gasoline fractions containing naphthenes and paraffins. The preferred charge stocks are those consisting essentially of naphthenes and paraffins although in some cases aromatics and/or olefins are also present. The preferred class includes straight run gasolines, natural gasolines, synthetic gasolines and the like. On the other hand, it is frequently advantageous to charge thermally or catalytically cracked gasolines or higher boiling fractions thereof to the reforming process of the present invention. Mixtures of straight run and cracked gasoline can also be used. The gasoline charge stock may be a full boiling range gasoline having an initial boiling point of from about 50° F. to about 1000° F. and an end boiling point within the range of from about 325 to 425° F., or may be a selected fraction thereof which usually will be a higher boiling fraction commonly referred to as a heavy naphtha—for example, a naphtha boiling in the range of $C_7$ to $C_{11}$. It is also within the scope of the present invention to charge pure hydrocarbons or mixtures of hydrocarbons, usually paraffins or naphthenes, which boil in the gasoline boiling range and are to be converted to aromatics.

The charge stock for the process of the present invention must be carefully controlled in the areas of concentration of sulfur-containing compounds and of oxygen-containing compounds. In general, it is preferred that the concentration of both of these constituents be reduced to low levels by any suitable pretreating means such as mild hydrogenation treatment (called in the art "hydrorefining," "hydrodesulfurization," etc.) with a suitable supported cobalt and/or molybdenum catalyst. This is not to be construed to exclude the possibility that the concentration of sulfur-containing compounds in the charge stock could be carefully adjusted in order to furnish the required amount of sulfur to the reforming zone; but this latter method is difficult to control and is, consequently, not preferred. In any event, it is necessary that the total concentration of water and of water-yielding substances in the charge stock be reduced to at least 25 p.p.m. calculated as equivalent water and preferably less than 10 p.p.m. These restrictions are doubly significant in one preferred embodiment of the present invention, in which the hydrogen gas contained in the effluent from the reforming zone is separated therefrom and at least a portion of the separated hydrogen gas is recycled to the reforming zone, because the available water and hydrogen sulfide will also be recycled with this hydrogen-rich gas. Accordingly, the concentration of these constituents will tend to build up to an equlibrium level in this recycle stream and small amounts of these materials in the input stream may, if the process is not carefully controlled, build up to substantial undesired levels in the recycle stream.

Accordingly, it is preferred to first reduce the sulfur and oxygen concentration of the charge stock to very low levels, such as 5 wt. p.p.m. or less respectively, and thereafter inject a controlled amount of sulfur or a sulfur-containing compound into the reforming zone in any suitable manner. Any reducible sulfur-containing compound, that does not contain oxygen, which is converted to hydrogen sulfide by reaction with hydrogen at the conditions in the reforming zone may be used. This class includes: aliphatic mercaptans such as ethyl mercaptan, propyl mercaptans, tertiary butyl mercaptans, etc.; aromatic mercaptans such as thiophenol and derivatives; naphthenic mercaptans such as cyclohexyl mercaptan; aliphatic sulfides such as ethylsulfide; aromatic sulfides such as phenyl sulfide; aliphatic disulfides such as tertiary butyl disulfides; aromatic disulfides such as phenyldisulfide; dithioacids; thioaldehydes; thioketones, heterocyclic sulfur compounds such as the thiophenes and thiophanes; and the like compounds. In addition, free sulfur or hydrogen sulfide may be used if desired. Usually, a mercaptan such as tertiary butyl mercaptan or heptyl mercaptan is the preferred additive for reasons of cost and convenience.

Regardless of which sulfur additive is used, it is clear that it may be added directly to the reforming zone independently of any input stream, or that it may be added to either the charge stock or the hydrogen stream or both of these. For example, one acceptable method would involve the addition of hydrogen sulfide to the hydrogen stream. However, the preferred procedure involves the admixture of the sulfur additive with the charge stock prior to its passage into the reforming zone.

The amount of sulfur entering the reforming zone at any given time is a function of residual sulfur in the charge stock, the amount of sulfur added to the charge stock, the amount of sulfur in the hydrogen stream, and the amount added directly to the zone. Regardless of the source of the sulfur entering the reforming zone, it is an essential feature of the present invention that the total from all sources must be continuously maintained in the range of about 50 p.p.m. to about 3000 p.p.m. based on weight of charge stock entering the reforming zone, and preferably about 150 to 1500 wt. p.p.m.

As indicated above, the reforming catalyst utilized in the present invention comprises an alumina carrier material (or alumina support) having combined therewith a platinum group component, a rhenium component, a sulfur component, and a halogen component. Considering first the alumina carrier material, it is preferred that it be a porous, adsorptive, high surface area support having a surface are of about 25 to 500 or more m.$^2$/gm. Suitable alumina materials are the crystalline aluminas known as gamma-, eta-, and theta- alumina, with gamma-alumina giving best results. In addition, in some embodiments the alumina carrier material may contain minor proportions of other well-known refractory inorganic oxides such as silica, zirconia, magnesia, etc. However, the preferred support is substantially pure gamma-alumina. In fact, an especially preferred carrier material has an apparent bulk density of about 0.30 to about 0.70 gm./cc. and has surface area characteristics such that the average pore diameter is about 20 to about 300 angstroms, the pore volume is about 0.10 to about 1.0 ml./gm. and the surface area is about 100 to about 500 m.$^2$/gm. A preferred method for manufacturing this alumina carrier material is given in U.S. Patent No. 2,620,314.

Another constituent of the reforming catalyst used in the present invention is a halogen component. Although the precise form of the chemistry of the association of the halogen component with aluminum carrier material is not entirely known, it is customary in the art to refer to the halogen component as being combined with the alumina or with the other ingredients of the catalyst. This combined halogen may be either fluorine, chlorine, iodine, bromine, or mixtures thereof. Of these, fluorine and chlorine are preferred for the purposes of the present invention. The halogen may be added to the alumina support in any suitable manner, either before, during, or after the addition of the other components. For example, the halogen may be added as an aqueous solution of an acid such as hydrogen fluoride, hydrogen chloride, hydrogen bromide, etc. In addition, the halogen or a portion thereof may be composited with the alumina during the impregnation of the latter with the platinum group component; for example, through the utilization of a mixture of chloroplatinic acid and hydrogen chloride. In another situation, the alumina hydrosol which is typically utilized to form the alumina carrier material may contribute at least a portion of the halogen component to the final composite. In any event, the halogen will be typically composited in such a manner as to result in a final composite containing about 0.1 to about 1.5 wt. percent, and preferably about 0.4 to about 0.9 wt. percent of halogen calculated on an elemental basis.

As indicated above, the reforming catalyst, also contains a platinum group metallic component. Although the process of the present invention is specifically directed to the use of a catalytic composite containing platinum or a compound of platinum, it is intended to include other platinum group metals such as palladium, rhodium, ruthenium, etc. The platinum group metallic component, such as platinum may exist within the final catalytic composite as a compound such as an oxide, sulfide, halide, etc., or as an elemental state. Generally, the amount of the platinum group metallic component present in the final catalyst is small compared to the quantities of the other components combined therewith. In fact, the platinum group metallic component generally comprises about 0.05 to about 1.0 wt. percent of the final catalyst calculated on an elemental basis. Excellent results are obtained when the catalyst contains about 0.3 to about 0.9 wt. percent of the platinum group metal.

The platinum group metallic component may be incorporated in the catalytic composite in any suitable manner such as coprecipitation or cogellation with the alumina support, ion-exchange with the alumina support and/or alumina hydrogel, or impregnation of the alumina support at any stage in its preparation either before, during, or after its calcination treatment. The preferred method of preparing the catalyst involves the utilization of water soluble compounds of the platinum group metals to impregnate the alumina support. Thus, the platinum group metal may be added to the alumina support by commingling the latter with an aqueous solution of chloroplatinic acid. Following the platinum impregnation, the impregnated carrier is typically dried and subjected to a conventional high calcination or oxidation technique.

Another essential constituent of the catalyst used in the present invention is the rhenium component. This component may be present as an elemental metal, as a chemical compound, such as the oxide, sulfide, halide, or in physical association with the alumina support and/or the other components of the catalyst. Generally, the rhenium component is utilized in an amount sufficient to result in a final catalytic composite containing about 0.05 to about 1.0 wt. percent rhenium calaculated as an elemental metal. The rhenium component may be incorporated in the catalytic composite in any suitable manner and at any stage in the preparation of the catalyst. As a general rule, it is advisable to introduce the rhenium at a later step of the preparation in order that the expensive metal will not be lose due to subsequent processing involving washing and purification treatments. The preferred procedure for incorporating the rhenium component involves the impregnation of the alumina support. The impregnation solution can comprise an aqueous solution of a suitable rhenium salt such as ammonium perrhenate, sodium perrhenate. rhenium chloride, etc. However, we have found that best results are obtained with perrhenic acid. In general, the rhenium component can be impregnated either prior to, simultaneously with, or after the platinum group metallic components is added to the support. However, we have determined that good results are achieved when the rhenium component is impregnated simultaneously with the platinum group metallic component. In fact, we have determined that a preferred procedure involves using an impregnation solution containing perrhenic acid, chloroplatinic acid and hydrogen chloride.

In addition, we have determined that an especially preferred catalytic composite is prepared when the weight ratio, calculated on an elemental basis, of the rhenium component to the platinum group metallic component is selected from the range of about .05:1 to about 2.75:1. This is particularly true when the total weight content of the rhenium component plus the platinum group metallic component in the catalytic composite is fixed in the range of about .2 to about 1.5 wt. percent and more preferably about .4 to about 1.0, calculated on an elemental basis. Accordingly, examples of especially preferred catalytic composites are composites containing: .1 wt. percent Re+.65 wt. percent Pt, .2 wt. percent Re +.55 wt. percent Pt, .375 wt. percent Rt+.375 wt. percent Pt, 0.55 wt. percent Re+0.20 wt. percent Pt, and 0.65 wt. percent Re+0.10 wt. percent Pt.

Regardless of the details of how the components of the catalyst are composited with the alumina carrier, the final catalyst generally will be dried at a temperature of from about 200° F. to about 600° F. for a period of from about 0.5 to 4 hours or more and finally calcined at a temperature of about 800° F. to about 1100° F. for a period of about 0.5 to 10 hours or more.

Thereafter, it is preferred that the resultant calcined catalytic composite be subjected to a substantially water-free reduction step. This step is designed to insure a uniform and finely divided dispersion of the metallic components throughout the alumina support. Preferably, substantially pure and dry hydrogen is used as the reducing agent in this step. The reducing agent is preferably contacted with the calcined catalyst at a temperature of about 1000° F., a gas hourly space velocity of about 700 hr.$^{-1}$ and for a period of about 1 to about 10 hours effective to reduce both metallic components to their elemental state.

The final step in preparation of the catalytic composite involves subjecting the reduced catalyst to a presulfiding operation designed to incorporate in the catalytic composite from about 0.05 to about 0.5 wt. percent sulfur calculated on an elemental basis and especially about 0.10 wt. percent. Preferably, this presulfiding treatment takes place in the presence of hydrogen and a suitable sulfur-containing compound such as hydrogen sulfide. Typically, this step comprises treating the reduced catalyst with a sulfiding gas such as a mixture of hydrogen and hydrogen sulfide having about 10 moles of hydrogen per mole of hydrogen sulfide at a temperature sufficient to effect the desired incorporation of sulfur, generally ranging from about 100° F. to 1100 F. or more.

According to the present invention, the gasoline fraction, hydrogen, and sulfur or a sulfur-containing compound are contacted with the catalyst in a reforming zone. This contacting may be accomplished in a fixed bed system, a moving bed system, a fluidized system, or in a batch type operation; however, in view of the danger of the attrition losses of the valuable catalyst and of well-known operational advantages, it is preferred to use a fixed bed system. In this system, a hydrogen-rich gas and the charge stock are preheated, by any suitable heating means, to the desired reaction temperature and then are passed in admixture with sulfur or a sulfur-containing compound, into a reforming zone containing a fixed bed of the catalyst. It is, of course, understood that the reforming zone may be one or more separate reactors with suitable heating means therebetween to insure that the desired conversion temperature is maintained at the entrance to each reactor. It is also to be noted that the reactants are typically in vapor phase and may be contacted with the catalyst bed in either upward, downward, or radial flow fashion with the latter being preferred.

It is an essential feature of the present invention that the reforming zone is maintained substantially water-free. To achieve this condition, it is necessary to control the water level present in the chargestock and the hydrogen stream which are being charged to the reforming zone. It is essential that the equivalent water entering the reforming zone from all sources be held to a level less than that equal to 25 wt. p.p.m. of the chargestock and preferably less than 10 p.p.m. In general, this can be accomplished by drying the charge stock with any suitable drying means known to the art such as a conventional solid adsorbent having a high selectivity for water, for instance, silica gel, activated alumina, calcium or sodium crystalline aluminosilicates, anhydrous calcium sulfate, high surface area sodium, and the like adsorbents. Similarly, the water content of the charge stock may be adjusted by suitable stripping operations in a fractionation column or like device. And in some cases a combination of adsorbent drying and distillation drying may be used advantageously to effect almost total removal of water from the charge stock. Additionally, it is preferred to dry the hydrogen stream entering the hydrocarbon conversion zone down to a level of about 5 volume p.p.m. of water or less. This can be conveniently accomplished by contacting the hydrogen stream with any suitable adsorbent such as the ones mentioned above. The preferred drying means is calcium aluminosilicate molecular sieves having a pore size of about 5 angstroms.

Although the pressure utilized in the reforming zone can be selected from the range of about 50 to 1000 p.s.i.g., the preferred pressure range is about 100 p.s.i.g. to about 600 p.s.i.g., and especially about 100 to 350 p.s.i.g. In fact, it is a singular advantage of the present invention that it allows stable operation at lower pressures than have heretofore been successfully utilized in continuous reforming systems. In other words, the present invention allows the operation of a continuous reforming system to be conducted at lower pressure (i.e. 100 to 350 p.s.i.g.) for about the same or better catalyst life before regeneration as has been heretofore realized with conventional catalysts at higher pressures (i.e. 400 to 600 p.s.i.g.). On the other hand, the stability feature of the present invention enables reforming operations conducted at pressures of 400 to 600 p.s.i.g. to achieve increased catalyst life before regeneration.

Similarly, the temperature required for reforming is generally lower than that required for a similar reforming operation using a high quality catalyst of the prior art. This significant and desirable feature of the present invention, is a consequence of the selectivity for the catalyst of the present invention for the previously characterized octane-upgrading reactions that are preferably induced in a typical reforming operation. Hence, the present invention requires a temperature in the range of from about 800° F. to about 1100° F. and preferably about 900° F. to about 1050° F. As is well-known to those skilled in the reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant product, is substantially lower for the process of the present invention than for conventional continuous reforming processes, all other conditions being equal.

Likewise, sufficient hydrogen is utilized in the reforming zone to provide an amount of about 2.0 to about 20 moles of hydrogen per mole of hydrocarbon entering the reforming zone with excellent results being obtained when about 7 to about 10 moles of hydrogen are used per mole of hydrocarbon. Moreover, the liquid hourly space velocity used is selected from the range of about 0.1 to about 10.0 hr.$^{-1}$ with a value in the range of about 0.5 to about 5.0 hr.$^{-1}$ being preferred.

The following examples are given to illustrate further the benefits that are derived from the present invention and the mode of operation thereof. It is understood that the examples are given for the sole purpose of illustration and are not to be considered to limit unduly the generally broad scope and spirit of the appended claims.

The catalysts used in the following examples are prepared using an alumina carrier material consisting essentially of gamma-alumina and prepared in the form of $\frac{1}{16}$ inch spherical particles by the oil-drop method which is described in U.S. Pat. No. 2,620,314.

The resulting spherical alumina particles are impregnated with a solution comprising chloroplatinic acid, hydrogen chloride and perrhenic acid in amounts, respectively, sufficient to yield a final catalyst containing 0.55 wt. percent platinum, 0.2 wt. percent rhenium, and 0.85 wt. percent combined chloride, all calculated on an elemental basis. The impregnated spheres are then dried at a temperature of 400° F. for about an hour, and thereafter calcined for a period of about 1 hour at a temperature of about 975° F.

The impregnated and calcined particles are thereafter subjected to a dry prereduction with substantially pure hydrogen at a temperature of about 1020° F., a gas hourly space velocity of about 700 hr.$^{-1}$ and a pressure slightly above atmospheric for a period of time of about 1 hour.

A mixture of $H_2$ and $H_2S$ containing about 10 to 1 moles of $H_2$ to $H_2S$ is then utilized to effect the incorporation of about 0.10 wt. percent sulfur in the resulting reduced catalyst. This sulfiding step is performed at essentially the same conditions as the prereduction step.

An analysis of the resulting catalyst shows it to contain, on an elemental basis: 0.55 wt. percent Pt, 0.20 wt. percent Re, 0.85 wt. percent Cl, and 0.10 wt. percent S. In addition, X-ray studies indicate that the metallic crystallites are uniformly dispersed throughout the supporting material and have an average size substantially less than about 50 angstroms in size. This then is an example of the catalyst which is used in the present invention and is hereinafter designated as Catalyst A.

Catalyst B is prepared in exactly the same manner as Catalyst A except that the amounts of chloroplatinic acid utilized is sufficient to result in a final catalyst containing 0.75 Pt instead of 0.55 Pt. This is a second example of the type of catalyst useful in the present invention.

The examples are performed in a laboratory scale reforming plant comprising a reactor containing a fixed bed of the catalyst, a hydrogen separator, a high surface area sodium dryer, a debutanizer column, and other conventional equipment such as pumps, compressors, controls, heating and cooling means, etc., the details of which are well-known to those skilled in the art.

The flow scheme utilized in these examples is as follows: (1) the charge stock and hydrogen are commingled, heated to conversion temperature and passed into the reactor; (2) an effluent stream is withdrawn from the reactor, cooled to about 55° F., and passed to the hydrogen separator wherein a hydrogen-rich gas separates from a hydrocarbon liquid phase; (3) the hydrogen-rich gas phase is withdrawn and a portion of it vented from the system in order to maintain pressure control; another portion is passed through the high surface area sodium dryer, recompressed, and ultimately returned to the reactor; and (4) the liquid phase from the separator is passed to the debutanizer column wherein light ends are taken overhead and a $C_5+$ reformate recovered as bottoms.

The characteristics of the charge stock used in the examples are given in Table I.

TABLE I—ANALYSIS OF HEAVY KUWAIT NAPHTHA

| | |
|---|---|
| API gravity, at 50° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. p.p.m. | 0.5 |
| Nitrogen, wt. p.p.m. | 0.1 |
| Aromatics, vol. percent | 8 |
| Paraffins, vol. percent | 71 |
| Naphthenes, vol. percent | 21 |
| Water, p.p.m. | 5.9 |
| Octane No., F-1 clear | 40.0 |

It is to be noted that the charge stock contains 5.9 wt. p.p.m. of equivalent water, and considering that the hydrogen stream is substantially water-free, the plant is operated in all examples, essentially at a water level equivalent to 5.9 wt. p.p.m. in the feed.

EXAMPLE I

This example demonstrates the effect of continuous sulfur addition on the various reforming catalysts in an accelerated, high stress test designed to emphasize stability differences in catalysts over a short period.

The test is performed at a pressure of 100 p.s.i.g., at a hydrogen to hydrocarbon mole ratio of 10:1, and a LHSV of 1.5. In accordance with standard practice for continuous reforming systems, a target octane, in this case 100 F-1 clear, is selected and conversion temperature continuously adjusted in order to achieve and maintain it.

Each run consists of a line-out period followed by 6 test periods of 24 hours. The principal parameter varied in these tests is sulfur level entering the reforming zone; each catalyst is studied first at conditions corresponding to 0.5 wt. p.p.m. equivalent sulfur in the feed, and then at a sulfur level corresponding to the continuous presence of 600 p.p.m. equivalent sulfur. In this latter case, tertiary butyl mercaptan is continuously added to the feed in order to achieve the desired sulfur level. The results of the series of runs are shown in Table II.

water-free reforming zone, the gasoline fraction, hydrogen and sulfur or a sulfur-containing compound with a reforming catalyst comprising a platinum component, a rhenium component, a sulfur component and a halogen component, composited with an alumina carrier material, at reforming conditions selected to produce a high octane reformate stream; said sulfur or sulfur-containing compound being continuously introduced into the reforming zone in an amount, calculated as elemental sulfur, equivalent to about 150 to about 1500 wt. p.p.m. of the gasoline fraction.

TABLE II.—RESULTS OF ACCELERATED STABILITY TESTS

|  | Catalyst A without S | | Catalyst A with S | | Catalyst B without S | | Catalyst B with S | |
| --- | --- | --- | --- | --- | --- | --- | --- | --- |
|  | Temp., °F. | $C_5+$, volume percent | Temp., °F. | $C_5+$, volume percent | Temp., °F. | $C_5+$, volume percent | Temp., °F. | $C_5+$, volume percent |
| Period No.: | | | | | | | | |
| 1 | 962 | ........ | 953 | 76.0 | 958 | ........ | 948 | 76.5 |
| 2 | 972 | 76.5 | 959 | 76.0 | 965 | 76.0 | 951 | 77.0 |
| 3 | 978 | 76.8 | 966 | 76.2 | 971 | 76.5 | 956 | 76.5 |
| 4 | 985 | 77.0 | 970 | 77.0 | 976 | 76.5 | 957 | 76.5 |
| 5 | 988 | 77.0 | 973 | 76.5 | 980 | 77.0 | 960 | 77.0 |
| 6 | 991 | 77.2 | 977 | 77.0 | 984 | 77.5 | 963 | 76.5 |
| Carbon level on catalyst, wt. percent | 4.95 | | 1.30 | | 6.53 | | 3.11 | |

From Table II, it can be deduced that the effect of sulfur in both cases is beneficial in that it significantly lowers the temperature required to make octane with no apparent loss in $C_5+$ yield, lowers the rate of temperature increase necessary to sustain octane, and substantially reduces the rate of carbon deposition on the catalyst. For instance, for Catalyst B, the run without sulfur required a 26° F. increment in temperature over the duration of the run to sustain octane; in sharp contrast, the sulfur run for Catalyst B required an increment in temperature of 15° F. Even more importantly, the catalyst used in the sulfur environment is consistently more active, requiring a much lower temperature to make octane with no corresponding sacrifice in $C_5+$ yield. Moreover, the carbon level numbers are indicative of the effect of the present invention on the principal mechanism of reforming catalyst deactivation.

EXAMPLE II

In order to demonstrate the stability feature of the present invention a second series of tests are performed with Catalyst A of Example I.

Conditions utilized in this run are somewhat less severe than those of Example I, and include: a pressure of 200 p.s.i.g., a 8:1 hydrogen to hydrocarbon mole ratio, and a LHSV of 2.0. Moreover, the target octane is 100.0 F-1 clear.

Two runs are made: one at an equivalent sulfur level entering the reforming zone less than 1 wt. p.p.m. and the second at a level of 600 wt. p.p.m.

Both runs are made for a period of 10 barrels of charge per pound of catalyst.

Average $C_5+$ yield and temperature stability data for the two runs indicate that the continuous addition of sulfur lowers the $C_5+$ yield decline from −0.45 vol. percent/BPP to −0.24 LV percent/BPP. Likewise, the rate of temperature increase necessary to make octane is lowered from 4.75° F./BPP to 2.75° F./BPP. In sum, the data manifests the superior stability feature of the present invention.

We claim as our invention:

1. A process for catalytically reforming a gasoline fraction for a catalyst life of at least 15 barrels of charge per pound of catalyst without catalyst regeneration, said process comprising continuously contacting, in a substantially water-free reforming zone, the gasoline fraction, hydrogen and sulfur or a sulfur-containing compound with a reforming catalyst comprising a platinum component, a rhenium component, a sulfur component and a halogen component, composited with an alumina carrier material, at reforming conditions selected to produce a high octane reformate stream; said sulfur or sulfur-containing compound being continuously introduced into the reforming zone in an amount, calculated as elemental sulfur, equivalent to about 150 to about 1500 wt. p.p.m. of the gasoline fraction.

2. The process of claim 1 wherein said halogen component is chlorine or fluorine.

3. The process of claim 1 wherein said reforming catalyst contains, on an elemental basis, about 0.1 to about 1.5 wt. percent of the halogen, about 0.05 wt. percent to about 1.0 wt. percent of the platinum and about 0.05 wt. percent to about 1.0 wt. percent rhenium, and about 0.05 to about 0.50 wt. percent sulfur.

4. The process of claim 1 wherein said reforming conditions include a pressure of about 100 to 350 p.s.i.g.

5. The process of claim 1 wherein said gasoline fraction is a high boiling naphtha boiling in the range of $C_7$ to $C_{11}$.

6. The process of claim 1 wherein said sulfur-containing compound is a mercaptan which is admixed with the gasoline fraction.

7. The process of claim 1 wherein said sulfur-containing compound is hydrogen sulfide.

References Cited

UNITED STATES PATENTS

| 2,952,611 | 9/1960 | Haxton et al. | 208—65 |
| 3,296,118 | 1/1967 | Czaskowski et al. | 208—138 |
| 3,330,761 | 7/1967 | Capsuto et al. | 208—139 |
| 3,415,737 | 12/1968 | Kluksdahl | 208—139 |
| 3,434,960 | 3/1969 | Jacobson et al. | 208—138 |
| 3,438,888 | 4/1969 | Spurlock | 208—139 |
| 3,442,796 | 5/1969 | Hayes | 208—139 |

OTHER REFERENCES

Blom et al.: "Hydrocarbon Processing and Petroleum Refiner," vol. 42, No. 10, pp. 132 to 134 (1963).

HERBERT LEVINE, Primary Examiner

U.S. Cl. X.R.

208—138